(12) United States Patent
Visco et al.

(10) Patent No.: US 8,129,052 B2
(45) Date of Patent: *Mar. 6, 2012

(54) POLYMER ADHESIVE SEALS FOR PROTECTED ANODE ARCHITECTURES

(75) Inventors: Steven J. Visco, Berkeley, CA (US); Yevgeniy S. Nimon, Danville, CA (US); Lutgard C. De Jonghe, Lafayette, CA (US); Bruce D. Katz, Emeryville, CA (US); Alexei Petrov, Walnut Creek, CA (US)

(73) Assignee: PolyPlus Battery Company, Berkeley, CA (US)

( * ) Notice: Subject to any disclaimer, the term of this patent is extended or adjusted under 35 U.S.C. 154(b) by 1232 days.

This patent is subject to a terminal disclaimer.

(21) Appl. No.: 11/514,678

(22) Filed: Sep. 1, 2006

(65) Prior Publication Data

US 2007/0051620 A1  Mar. 8, 2007

Related U.S. Application Data

(60) Provisional application No. 60/713,668, filed on Sep. 2, 2005.

(51) Int. Cl.
 *H01M 4/40* (2006.01)
 *H01M 4/76* (2006.01)
 *H01M 2/08* (2006.01)
(52) U.S. Cl. ............... 429/231.9; 429/246; 429/304; 429/322
(58) Field of Classification Search ............ 429/137
 See application file for complete search history.

(56) References Cited

U.S. PATENT DOCUMENTS

| | | | |
|---|---|---|---|
| 2,996,562 | A | 8/1961 | Meyers |
| 3,607,417 | A | 9/1971 | McRae et al. |
| 3,703,415 | A | 11/1972 | Mitoff et al. |
| 3,912,536 | A | 10/1975 | Galli et al. |
| 4,091,182 | A | 5/1978 | Farrington et al. |
| 4,210,707 | A | 7/1980 | Farrington |
| 4,401,731 | A | 8/1983 | Steinleitner |
| 4,414,293 | A | 11/1983 | Joy et al. |

(Continued)

FOREIGN PATENT DOCUMENTS

EP  0838441  4/1998

(Continued)

OTHER PUBLICATIONS

Linden and T.B. Reddy, *Handbook of Batteries*, McGraw-Hill, NY 3$^{rd}$ Edition, 2002, p. 38.5.

(Continued)

*Primary Examiner* — Ula C Ruddock
*Assistant Examiner* — Patricia Davis
(74) *Attorney, Agent, or Firm* — Weaver Austin Villeneuve & Sampson LLP

(57) ABSTRACT

Protected anode architectures for active metal anodes have a polymer adhesive seal that provides an hermetic enclosure for the active metal of the protected anode inside an anode compartment. The compartment is substantially impervious to ambient moisture and battery components such as catholyte (electrolyte about the cathode), and prevents volatile components of the protected anode, such as anolyte (electrolyte about the anode), from escaping. The architecture is formed by joining the protected anode to an anode container. The polymer adhesive seals provide an hermetic seal at the joint between a surface of the protected anode and the container.

78 Claims, 5 Drawing Sheets

U.S. PATENT DOCUMENTS

| | | | |
|---|---|---|---|
| 4,985,317 | A | 1/1991 | Adachi et al. |
| 5,166,011 | A | 11/1992 | Rao et al. |
| 5,314,765 | A | 5/1994 | Bates |
| 5,368,702 | A | 11/1994 | de Nora |
| 5,506,068 | A | 4/1996 | Dan et al. |
| 5,702,995 | A | 12/1997 | Fu |
| 6,025,094 | A | 2/2000 | Visco et al. |
| 6,030,909 | A | 2/2000 | Fu |
| 6,214,061 | B1 | 4/2001 | Visco et al. |
| 6,218,050 | B1* | 4/2001 | Yoon et al. ............ 429/231.8 |
| 6,228,527 | B1* | 5/2001 | Medeiros et al. ........... 429/119 |
| 6,315,881 | B1 | 11/2001 | Fu |
| 6,358,651 | B1 | 3/2002 | Chen et al. |
| 6,383,347 | B1 | 5/2002 | Stuart et al. |
| 6,391,492 | B1 | 5/2002 | Kawakami et al. |
| 6,402,795 | B1 | 6/2002 | Chu et al. |
| 6,413,284 | B1 | 7/2002 | Chu et al. |
| 6,413,285 | B1 | 7/2002 | Chu et al. |
| 6,485,622 | B1 | 11/2002 | Fu |
| 7,282,295 | B2 | 10/2007 | Visco et al. |
| 7,582,385 | B2* | 9/2009 | Clarke ..................... 429/229 |
| 7,824,806 | B2 | 11/2010 | Visco et al. |
| 2001/0041294 | A1 | 11/2001 | Chu et al. |
| 2002/0034678 | A1* | 3/2002 | Shibuya et al. ............... 429/50 |
| 2002/0110728 | A1 | 8/2002 | Gozdz et al. |
| 2003/0082445 | A1* | 5/2003 | Smith et al. ................ 429/176 |
| 2003/0134198 | A1* | 7/2003 | Sawa et al. ................ 429/221 |
| 2003/0143456 | A1* | 7/2003 | Kazacos et al. ............. 429/105 |
| 2004/0067417 | A1* | 4/2004 | Oosawa et al. ............. 429/210 |
| 2004/0081894 | A1 | 4/2004 | Nimon et al. |
| 2004/0126653 | A1* | 7/2004 | Visco et al. ................ 429/137 |
| 2004/0142244 | A1 | 7/2004 | Visco et al. |
| 2004/0191604 | A1 | 9/2004 | Artibise et al. |
| 2004/0191617 | A1 | 9/2004 | Visco et al. |
| 2004/0197641 | A1 | 10/2004 | Visco et al. |
| 2005/0095506 | A1 | 5/2005 | Klaassen |
| 2005/0100792 | A1 | 5/2005 | Visco et al. |
| 2005/0100793 | A1 | 5/2005 | Jonghe et al. |
| 2005/0147883 | A1 | 7/2005 | Kubota |
| 2005/0175894 | A1 | 8/2005 | Visco et al. |
| 2006/0078790 | A1 | 4/2006 | Nimon et al. |
| 2007/0037058 | A1 | 2/2007 | Visco et al. |
| 2007/0051620 | A1 | 3/2007 | Visco et al. |
| 2007/0117007 | A1 | 5/2007 | Visco et al. |

FOREIGN PATENT DOCUMENTS

| | | |
|---|---|---|
| EP | 1162675 | 12/2001 |
| WO | 04/001879 | 12/2003 |
| WO | 2004/109823 | 12/2004 |
| WO | WO2005/038953 | 4/2005 |
| WO | WO2005/038962 | 4/2005 |
| WO | WO2005/083829 | 9/2005 |
| WO | 2009/102982 | 8/2009 |

OTHER PUBLICATIONS

PCT patent application No. PCT/US2004/033424, International Search Report Mailed Mar. 6, 2006.

PCT patent application No. PCT/US2004/033371, International Search Report mailed Mar. 6, 2006.

PCT patent application No. PCT/US2004/033371, Written Opinion mailed Mar. 6, 2006.

PCT patent application No. PCT/US2004/033424, International Preliminary Report on Patentability mailed Apr. 27, 2006.

U.S. Appl. No. 10/824,944, Office Action mailed Sep. 7, 2006.

U.S. Appl. No. 10/824,944, Office Action mailed Mar. 12, 2007.

LOCTITE® Technical Data Sheet, LOCTITE® Hysol® E-120HP™, Aug. 2001.

Galbraith, A.D., *The lithium-water-air battery for automotive propulsion*, Chemical Abstracts Service, Columbus, Ohio, Dec. 31, 1976, XP-002355800.

European patent application No. 04 794 699.1-1227 examination report mailed Nov. 6, 2006.

Thokchom, Joykumar S., et al., "Water Durable Lithium Ion Conducting Composite Membranes for the $Li_2O$-$Al_2O_3$-$TiO_2$-$P_2O_5$ Glass-Ceramic", *Journal of The Electrochemical Society*, 154 (4), 2007, pp. A331-A336.

European patent application No. 04794699.1, Examination Report dated May 31, 2007.

WO patent application No. PCT/US2009/034101, International Search Report and Written Opinion mailed Aug. 24, 2009.

PCT patent application No. PCT/US06/30985, International Search Report and Written Opinion dated Jul. 31, 2007.

PCT patent application No. PCT/US06/45407, International Search Report and Written Opinion dated Aug. 30, 2007.

U.S. Appl. No. 10/824,944, Notice of Allowance dated Jul. 31, 2007.

U.S. Appl. No. 10/824,944, Allowed Claims.

CN patent application No. 2006800376117, Office Action mailed Sep. 25, 2009.

U.S. Appl. No. 11/501,676, Office Action mailed Mar. 26, 2010.

U.S. Appl. No. 12/607,360, "Compliant seal structures for protected active metal anodes", Visco et al., filed Oct. 28, 2009.

AU patent application No. 2006280097, Examiner's First Report mailed Jun. 9, 2010.

U.S. Appl. No. 11/501,676, Notice of Allowance mailed Sep. 9, 2010.

U.S. Appl. No. 11/501,676, Allowed Claims.

EP patent application No. 06813340.4, Extended Search Report mailed Feb. 24, 2011.

Visco, S.J. et al., "Lithium-Air", Encyclopedia of Electrochemical Power Sources, Dyer (editor), Elsevier, 2009, ISBN: 9780444527455, pp. 376-383.

U.S. Appl. No. 12/032,564, Office Action mailed Jun. 9, 2011.

CN patent application No. 200680037611.7, Office Action mailed May 11, 2011.

U.S. Appl. No. 12/032,564, Office Action mailed Aug. 24, 2011.

U.S. Appl. No. 12/032,564, Notice of Allowance mailed Sep. 8, 2011.

U.S. Appl. No. 12/032,564, Allowed Claims, Sep. 8, 2011.

* cited by examiner

POLYMER ADHESIVE SEALS FOR PROTECTED ANODE ARCHITECTURES

CROSS-REFERENCE TO RELATED APPLICATIONS

This application claims priority to U.S. Provisional Patent Application No. 60/713,668 filed Sep. 2, 2005, titled ADHESIVE SEALS FOR PROTECTED ACTIVE METAL ANODES. This provisional patent application is incorporated herein by reference in its entirety for all purposes.

BACKGROUND OF THE INVENTION

1. Field of the Invention

The present invention relates generally to electrode structures for use in batteries. More particularly, this invention relates to protected anode architectures that provide a sealed enclosure for a protected active metal anode (e.g., Li) in order to facilitate its incorporation/optimization into a variety of battery cell structures.

2. Description of Related Art

The low equivalent weight of alkali metals, such as lithium, render them particularly attractive as a battery electrode component. However, alkali metal anodes based on Li (e.g., Li metal foil, LiSn, $LiC_6$) are highly reactive in ambient atmosphere, and are known to corrode or degrade in a variety of electrolytes, such as aqueous and even non-aqueous systems. Accordingly, the incorporation of lithium based anodes into electrochemical devices requires special processing, and the selection of suitable electrolytes is limited, as is the choice of cathode system.

Typically, lithium battery manufacture is conducted in inert environments in order to guard against degradation of lithium until it is hermetically sealed within a battery cell container. Moreover, in conventional active metal batteries such as lithium batteries, the lithium electrode (anode), microporous separator (e.g, Celgard), and positive electrode (cathode) are all in intimate contact with the organic aprotic solvent in the liquid electrolyte. So, the choice of battery cell chemistry is limited to systems in which the electrolyte is stable to both the cathode and the anode. Moreover, conventional cell architectures do not permit optimization of electrolytes or cathode-side solvent systems without impacting anode stability or performance and vice-versa Prior work in the present applicants' laboratories has led to the development of technology for protecting active metal anodes with highly ionically conductive protective membrane architectures. These protected active metal anode structures and associated electrochemical cells, are described in applicants' co-pending published US Applications US 2004/0197641, now U.S. Pat. No. 7,645,543, issued Jan. 12, 2010), US 2005/0175894, now U.S. Pat. No. 7,282,295, issued Oct. 16, 2007), and their corresponding International Patent Applications WO 2005/038953 and WO 2005/083829, respectively. These developments represent major advances in active metal battery technology, for instance rendering possible functional Li/air and Li/water batteries.

This technology would be further advanced by the development of appropriate barrier seals that would facilitate and/or optimize the incorporation of these protected active metal anodes into a variety of cell structures.

SUMMARY OF THE INVENTION

The present invention provides protected anode architectures comprising protected active metal anodes having polymer adhesive barrier seals, and methods for their fabrication. The architecture provides an hermetic enclosure for the active metal anode inside an anode compartment. The compartment is substantially impervious to ambient moisture and battery components such as catholyte (electrolyte about the cathode, and in some aspects catholyte may also comprise dissolved or suspended redox active species and redox active liquids), and prevents volatile components of the protected anode, such as anolyte (electrolyte about the anode), from escaping. The architecture is formed by joining the protected anode to an anode container. The polymer adhesives of the instant invention provide an hermetic seal at the joint between a surface of the protected anode and the container.

One aspect of the invention is to provide polymer adhesive seals for protected anode architectures that facilitate their use in electrochemical environments including aqueous solutions, water and water-based electrolytes, air, dissolved redox species and other materials reactive to lithium and other active metals, including organic solvents/electrolytes and ionic liquids; and for their incorporation into battery cells including those of Li/seawater, Li/air, and advanced active metal ion rocking chair batteries such as those consisting of a $LiC_6$ anode and comprising the class of transition metal intercalation cathodes including $Li_3V_2(PO_4)_3$, $V_2O_5$, $V_6O_{13}$, $LiCoO_2$, $LiMn_2O_4$, $LiNiO_2$, $Li_3V_2P_3O_{11}F$ and the like.

The protected anodes comprise an active metal anode (e.g., Li, LiSn, $LiC_6$) protected on its surface by a protective membrane architecture. The membrane architecture has a first surface that is ionically conductive and chemically compatible with the active metal anode and a second surface that is impervious, ionically conductive and chemically compatible with environments that are corrosive to the active metal anode (e.g., aqueous solutions). Accordingly, the active metal anode is in ionic continuity with the protective membrane architecture. By ionic continuity, it is meant that under an associated electric field and/or concentration gradient active metal ions are transportable between the active metal anode and the protective membrane architecture. The protective membrane architectures include ionically conductive composites, ionically conductive membranes and ionically conductive protective architectures and the like as described in applicants' co-pending applications incorporated by reference above.

Protected anodes comprising protective membrane architectures are chemically stable on one side to the active metal anode, and on the other side to ambient conditions and cathode environments (cathode structures and catholyte). Protected anodes offer significant advantages in that they enable the use of anode-incompatible materials, such as catholyte, on the cathode side without deleterious impact on the anode, and vice versa.

Protected anodes and associated electrochemical structures in accordance with the present invention are described in applicants' co-pending published US Applications, US 2004/0126653 (Ser. No. 10/686,189; now U.S. Pat. No. 7,282,296, issued), US 2004/0142244 (Ser. No. 10/731,771; now U.S. Pat. No. 7,282,302, issued), US 2004/0191617 (Ser. No. 10/772,228; now U.S. Pat. No. 7,390,591, issued Jun. 24, 2008), US 2004/0197641 (Ser. No. 10/772,157; now U.S. Pat. No. 7,645,543, issued Jan. 12, 2010) and US 2005/0175894 (Ser. No. 10/824,944; now U.S. Pat. No. 7,282,295, issued Oct. 16, 2007) incorporated by reference herein.

In accordance with the present invention, the protected anodes are integrated into the framework of a protected anode architecture by joining the protective membrane architecture of the protected anode to an anode container. The anode container in conjunction with the protective membrane architecture provides the mechanical structure that forms the anode compartment, which in turn fully encloses the active metal anode. The polymer adhesive seals of the instant invention seal the joint between the membrane architecture and the container.

Integrating the protected anodes into the framework of the protected anode architecture facilitates their use in electrochemical cell structures as the anode compartment completely decouples the active metal anode from the cathode environment of the cell.

The architectures of the present invention are particularly useful for batteries based on active metal, alloy or intercalation electrodes that enable high energy density batteries such as alkali metal anodes such as Li or Na, alkali metal alloys (e.g., LiAl, LiSn, $Na_4PB$ and LiAg), and intercalation compounds comprising active metal ions (e.g., $LiC_6$), all of which are highly reactive in ambient conditions and aqueous environments, and are also corroded in all but the most carefully chosen organic aprotic electrolyte solutions. The de-coupling by the anode compartment enables battery chemistries otherwise thought impractical such as those based on active metal anodes in conjunction with aqueous (water) based cathodes, such as Li/air, Li/seawater and Li/metal-hydride and the lithium alloy and lithium-ion variants of these. Moreover, it also allows for the independent optimization of anolyte and catholyte, which can have great benefit in the development of advanced rocking chair batteries such as high voltage Li-ion cells.

The seals of the present invention are comprised of polymeric adhesives. While no polymers are considered completely impermeable, the inventors have discovered that certain polymeric adhesives are chemically resistant to anolyte and catholyte environments, and that these adhesives also form a strong bond to the protective membranes and are themselves impervious to the elements inside and/or outside the anode compartment that they come in contact with. Moreover, the polymeric adhesive seals of the instant invention can be applied at temperatures and in environments that do not adversely affect the electrical and mechanical properties of the protective membrane, or other components of the anode architecture. The polymeric adhesive seals of the instant invention are set at temperatures that avoid membrane stresses caused by thermal mismatch. Preferably the temperature for applying and setting the seal does not exceed 350° C. More preferably the temperature is less than 200° C., and it is most preferred to apply and set the seal at or around room temperature in an air environment. For example, in one embodiment of the instant invention, a thermosetting epoxy based polymeric adhesive is used to seal and bond the container to the membrane architecture. This epoxy adhesive is settable at room temperature (about 25° C.) and provides a hermetic barrier and is chemically stable to both anolyte organic solvents (e.g., DME, diglyme, PC) and catholyte aqueous solutions (e.g., seawater, caustic, neutral, acidic).

The present invention is directed to protected anode architectures having polymeric adhesive seals and methods to configure the seals in order to form a substantially impervious anode compartment, and the incorporation of the protected anode architectures into electrochemical cell environments and structures such as battery cells.

These and other features of the invention will be further described and exemplified in the detailed description below.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
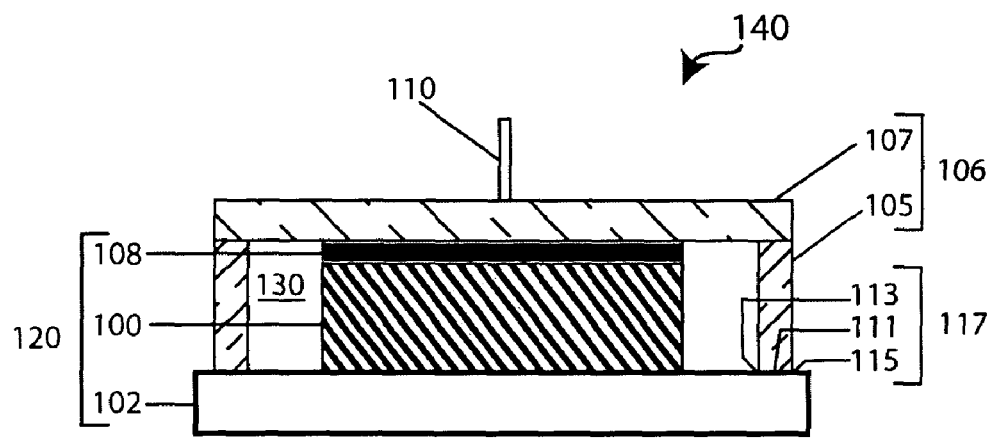
FIGS. 1A-C illustrate cross-sectional depictions of protected anode architectures in accordance with embodiments of the present invention.
Figure 1B:
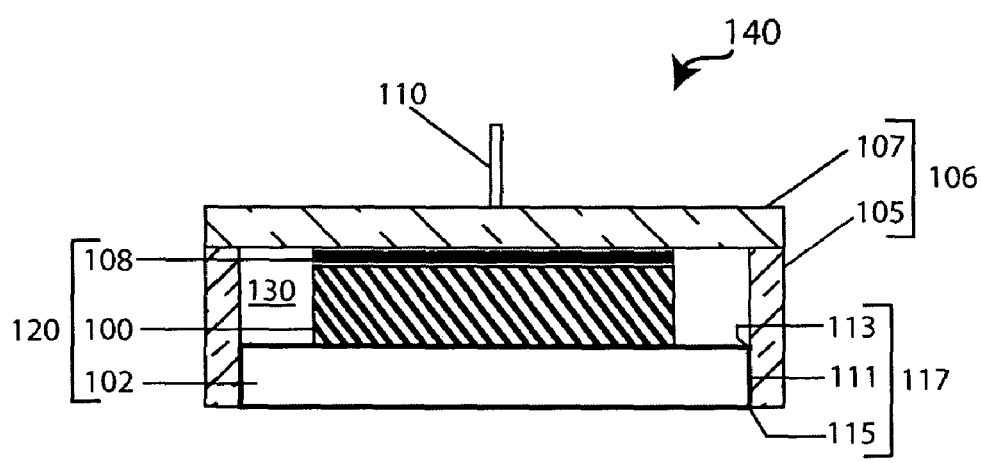
Figure 1C:
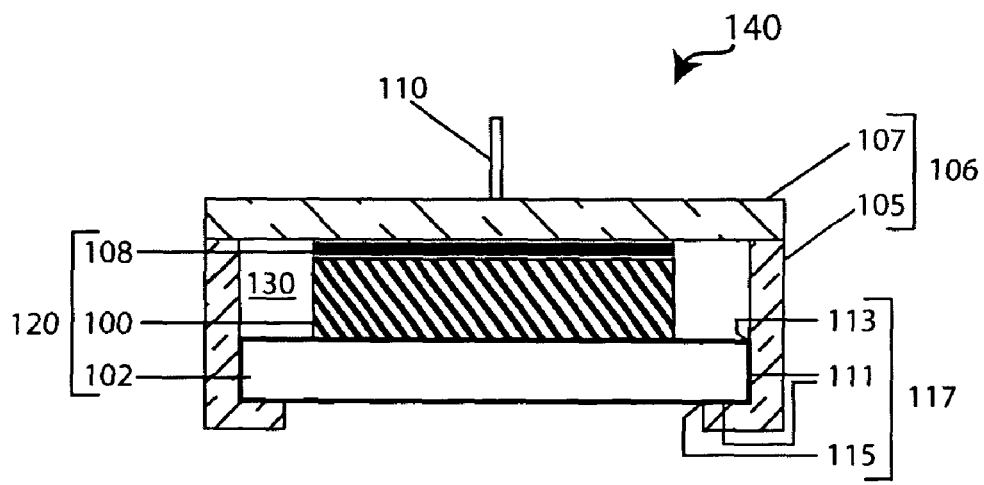

Protected anode architectures 140 in accordance with the present invention are illustrated in FIGS. 1A-C. The architectures comprise a protected anode 120, comprising an active metal anode 100 in ionic continuity with a protective membrane architecture 102, joined to an anode container 106 having an open end. By ionic continuity, it is meant that under an associated electric field and/or concentration gradient active metal ions are transportable between the active metal anode and the protective membrane architecture. The joint between the protected anode 120 and the container 106 is formed such that the protective membrane architecture 102 of the protected anode provides a substantially impervious wall component over the open container end. The anode container 106 in combination with the protective membrane 102 provides a mechanical structure that forms a substantially impervious anode compartment 130 that fully encloses the active metal anode 100. In accordance with the present invention, polymeric adhesives hermetically seal the joint between the membrane and the container, generally at 117.

For a material of the protected anode architecture to be substantially impervious it is meant that the material provides a sufficient barrier to constituents that it contacts from the external and/or the internal environment of the anode compartment, such that anode performance is not degraded. For example, for a material to be substantially impervious to the external environment (e.g., moisture, aqueous and non-aqueous catholytes, constituents from the cathode environment including redox active species and solvents and other active metal corrosive battery component materials that would be damaging to the active metal anode) it provides a sufficient barrier to the constituents of the external environment that it contacts to prevent any such damage that would degrade anode performance from occurring. Likewise, for a material to be substantially impervious to the internal environment of the anode compartment, it provides a sufficient barrier to internal components that it contacts, including volatile anolyte solvents, from escaping, to prevent degradation of the anode performance. The protected anode architectures are hermetically sealed in the sense that the anode compartment is substantially impervious to both external and internal environments that it comes in contact with.

Adhesive polymer seals of the instant invention are substantially impervious to at least one of the external and internal environments of the anode compartment. In one embodiment a polymer adhesive seal is substantially impervious to both the external and internal environments; as such it can be used as the sole sealant to seal the container to the protective membrane architecture, generally at 117. In another embodiment, more than one type of polymer adhesive seal is employed to fully seal-off the anode compartment: for example, one polymer adhesive seals is substantially impervious to the external environment and another polymer adhesive seal of a different structure or composition is substantially impervious to the internal environment. In such embodiments, the polymer adhesive seals are configured in such a manner that the anode compartment is substantially impervious to both the external and internal environments. The relative configuration of the polymer adhesive seal(s) of the instant invention is described in further detail by referring to detailed portions of the joint at 117 between the anode container and protective membrane, for which they seal.

Details of the joint at 117 are depicted in FIGS. 1A-C. The interface at the joint between the anode container and the protective membrane is at 111. There are also two edges at the interface of the joint where the container and membrane meet: one interface edge is on the interior wall of the anode compartment, at 113, and the other is on the exterior wall of the anode compartment, at 115. The embodiments illustrated in FIGS. 1A-C illustrate three possible embodiments of protected anode architectures in accordance with the present invention. In one embodiment, illustrated in FIG. 1A, the joint between the protected anode and the container is formed between the edge of the container wall and the surface of the protective membrane, generally at 117. This embodiment provides a convenient platform for bonding and sealing during fabrication. In another embodiment, illustrated in FIG. 1B, the edge of the protective membrane architecture is joined to the inner wall surface of the container, generally at 117. This embodiment minimizes the inactive area of the anode. In a third embodiment, illustrated in FIG. 1C, the container wall includes an edge lip that provides a bonding and sealing platform. This embodiment enables thin walled containers, while the edge lip provides a convenient platform for bonding and sealing. The embodiments illustrated in FIGS. 1. A-C exemplify the present invention and are not intended to be limiting.

One or more polymer adhesive seals, in accordance with the invention, are set in the region of the joint at 117. In one embodiment the polymer adhesive seal is set at the interface, 111, and on both the interior and exterior wall edges, 113 and 115 respectively. In another embodiment a seal is set at the interface 111 only. In another embodiment a seal is set at the interface 111 and on one of the interface edges. Where adhesive is applied to multiple points the same or a different type of polymer adhesive (e.g., one with a different composition or chemical structure) can be used at each point. In one specific embodiment, three different types of polymer adhesive seals are employed at 111, 113, and 115. In another specific embodiment one type of polymer adhesive seal is set at the interface edge on the interior wall of the anode compartment and a different type of seal is set at the interface edge on the exterior wall of the anode compartment. Further details concerning the relative configuration of the polymer adhesive seals and the motivation for setting the seals at various locations about the joint are described later in the specification.

The protected anode may optionally include a current collector 108, composed of a suitable conductive metal that does not alloy with or intercalate the active metal. When the active metal is lithium, examples of suitable current collector materials include nickel or copper. Furthermore, an electronically conductive terminal, 110 in electronic continuity with the active metal anode directly provides for passage of electrons into and out of the anode compartment. For example the terminal may be in direct contact with the active metal anode or with the current collector. The polymer adhesives of the present invention also provide a particularly suitable feedthrough seal between the terminal connector and the container (e.g., the cover lid or container wall), as they may be applied and set at temperatures that do not adversely affect other components of the anode architecture. The terminal 110 may be a metal tab such as a foil or, as shown in FIG. 1, a wire composed of nickel, stainless steel or copper. The tab is welded to the current collector 108 or attached to the active metal anode 100 by techniques that are known to those of skill in the art of battery manufacture, including resistance welding, ultrasonic welding, and pressure. The architecture may also include structure for maintaining contact among components inside the anode compartment.

The protected anode architectures of the present invention are useful for active metal electrodes (anodes) that are highly reactive in ambient conditions and can benefit from a protected anode structure. The active metal anode 100 comprises at least one of an active metal, active metal alloying metal, active metal ion and active metal intercalating anode material.

The active metals are generally alkali metals (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In, Sb. Preferred alloys include lithium aluminum alloys, lithium silicon alloys, lithium tin alloys, lithium silver alloys, and sodium lead alloys (e.g., $Na_4Pb$). Preferred active metal electrodes (anodes) are composed of the alkali metals lithium (Li) or sodium (Na). Li is particularly preferred.

Moreover, in a discharged state, the active metal anode may be an active metal alloying metal such as aluminum, silicon or tin, or an active metal intercalating material such as carbon or others well known in the art. The use of active metal intercalating materials that reversibly intercalate and de-intercalate active metal ions such as Li ions and Na ions provide beneficial characteristics. First of all, it allows prolonged cycle life of the battery without the risk of formation of active metal dendrites. Preferred active metal intercalating materials have a potential near that (e.g., within about 1 volt) of their corresponding active metal (e.g., Li, Na). A preferred active metal intercalating material is carbon.

The protected anode architectures of the present invention enable active metal anodes to be used in environments that if not for the substantially impervious anode compartment would not be possible. Moreover, the imperviousness of the enclosure enables anodes having a very long service life. Accordingly, in one embodiment of the instant invention the active metal anodes have high area capacity such that the active metal anode is at least 10 microns thick (e.g., a Li active metal anode having 10 micron thickness yields 2 $mAh/cm^2$), and may be up to 1 cm (e.g., a Li active metal anode having 1 cm thickness yields 2 Ah/cm$^2$) or more thick. Some preferred thickness ranges are preferably between 10 and 50 microns, 50 and 100 microns, 0.1 and 1 mm, 1 mm and 10 mm, 10 mm and 100 mm, and 100 mm and 500 mm thick.

Referring back to FIG. 1, the anode container 106 forms part of the mechanical structure of the anode compartment. Accordingly, the material of the container is substantially impervious and chemically compatible with elements that it directly contacts, from inside or outside the anode compartment. The container may comprise any suitable material, flexible or rigid, so long as it meets the prerequisite of substantial imperviousness and chemical stability; it may be composed of glass (e.g., Pyrex), metals such as stainless steel, aluminum, aluminum alloys, titanium, nickel coated aluminum and others; plastics such as polypropylene, acrylics, PVC and others; plastic based composites such as Garolite™, and epoxy/fiberglass composites and laminates, in particular metal-plastic laminates such as Laminate 95014 (manufactured by Lawson Mardon Flexible, Inc. in Shelbyville, Ky.).

The anode container, 106, may take on a number of configurations, for example the container may be a single component or it may be composed of several structural elements joined together. In a preferred embodiment, as illustrated in FIGS. 1A-C, the container comprises a wall structure 105 having a first and second opening, and a cover lid 107. The geometric shape of the wall structure may be of any form, it is typically of square, circular or rectangular section, for example circular, and it has at least one open end for the placement of the protective membrane architecture. In one method of fabricating the protected anode architecture, once all components have been configured inside the anode compartment and the membrane architecture of the protected anode has been joined to the container wall such that it covers the first opening, the final cover seal is made over the second opening by joining the top cover to the wall structure. In one embodiment the container cover comprises a silicone rubber stopper compression sealed against the wall structure of the anode container. Preferably, the container cover comprises materials such as those described above for the material of the container and is bonded and sealed to the container wall structure using the polymer adhesive seals and bonding agents of the instant invention.

The protective membrane architecture 102 is in ionic continuity with the active metal anode 100 and selectively transports active metal ions into and out of the anode compartment 130 while providing an impervious barrier to the environment external to the anode compartment. It also provides a barrier to components inside the anode compartment from escaping. Protective membrane architectures suitable for use in the present invention are described in applicants' co-pending published US Applications US 2004/0197641 and US 2005/0175894 and their corresponding International Patent Applications WO 2005/038953 and WO 2005/083829, respectively, incorporated by reference herein.

FIGS. 2A-D illustrate representative protective membrane architectures from these disclosures suitable for use in the present invention. The protective membrane architectures provide a barrier to isolate an active metal, active metal alloy or active metal ion anode in the anode compartment from ambient and/or the cathode side of the cell while allowing for efficient ion active metal ion transport into and out of the anode compartment. The architecture may take on several forms. Generally it comprises a solid electrolyte layer that is substantially impervious, ionically conductive and chemically compatible with the external ambient (e.g., air or water) or the cathode environment.

Figure 2A:
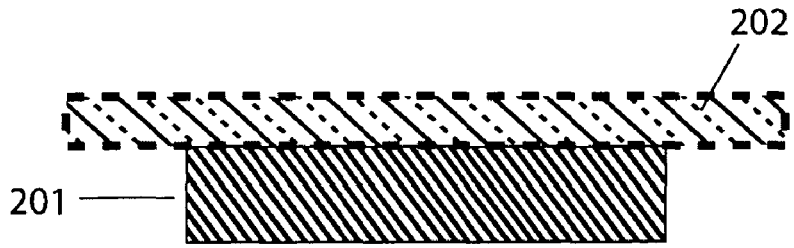
FIGS. 2A-D illustrate various alternative configurations of a protective membrane architectures in accordance with the present invention.

Referring to FIG. 2A, the protective membrane architecture can be a monolithic solid electrolyte 202 that provides ionic transport and is chemically stable to both the active metal anode 201 and the external environment. Examples of such materials are Na-β" alumina, LiHfPO$_4$ and NASICON, Nasiglass, Li$_5$La$_3$Ta$_2$O$_{12}$ and Li$_5$La$_3$Nb$_2$O$_{12}$. Na$_5$MSi$_4$O$_{12}$ (M: rare earth such as Nd, Dy, Gd).

More commonly, the ion membrane architecture is a composite composed of at least two components of different materials having different chemical compatibility requirements, one chemically compatible with the anode environment in the interior of the anode compartment, the other chemically compatible with the exterior; generally ambient air or water, and/or battery electrolytes/catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. The properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

Figure 2B:
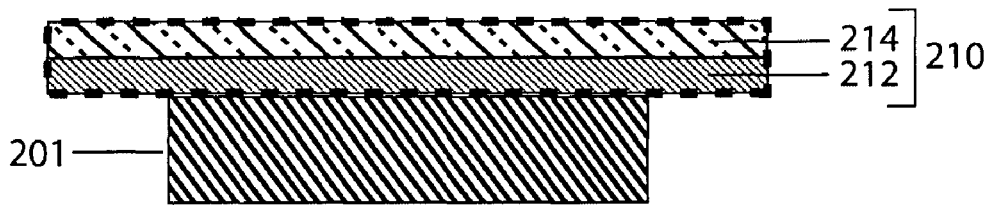
Figure 2C:
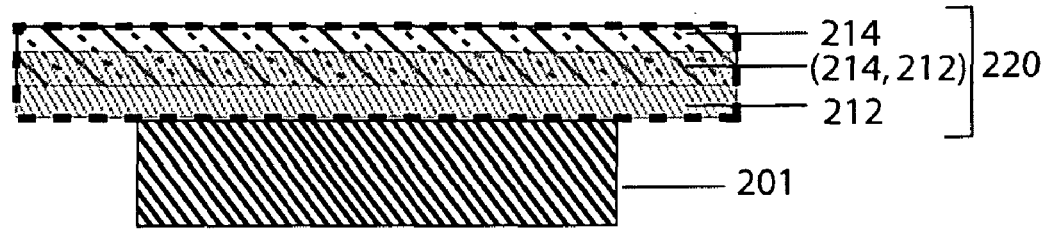

Referring to FIG. 2B, the protective membrane architecture can be a composite solid electrolyte 210 composed of discrete layers, whereby the first material layer 212 is stable to the active metal anode 201 and the second material layer 214 is stable to the external environment. Alternatively, referring to FIG. 2C, the protective membrane architecture can be a composite solid electrolyte 220 composed of the same materials, but with a graded transition between the materials rather than discrete layers.

Generally, the solid state composite protective membrane architectures (described with reference to FIGS. 2B and C) have a first and second material layer. The first material layer (or first layer material) of the composite is ionically conductive, and chemically compatible with an active metal electrode material. Chemical compatibility in this aspect of the invention refers both to a material that is chemically stable and therefore substantially unreactive when contacted with an active metal electrode material. It may also refer to a material that is chemically stable with air, to facilitate storage and handling, and reactive when contacted with an active metal electrode material to produce a product that is chemically stable against the active metal electrode material and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Figure 2D:
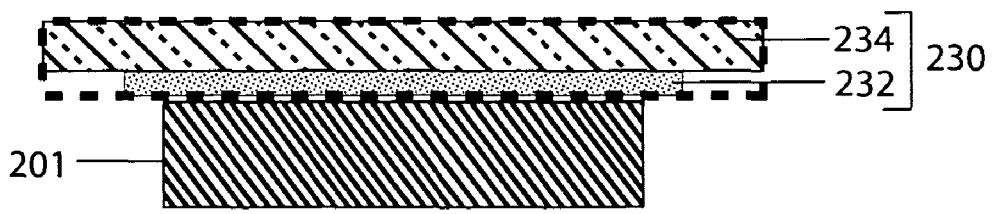

A fourth suitable protective membrane architecture is illustrated in FIG. 2D. This architecture is a composite 230 composed of an interlayer 232 between the solid electrolyte 234 and the active metal anode 201 whereby the interlayer is impregnated with anolyte. Thus, the architecture includes an active metal ion conducting separator layer with a non-aqueous anolyte (i.e., electrolyte about the anode), the separator layer being chemically compatible with the active metal and in contact with the anode; and a solid electrolyte layer that is substantially impervious (pinhole- and crack-free) ionically conductive layer chemically compatible with the separator layer and aqueous environments and in contact with the separator layer. The solid electrolyte layer of this architecture (FIG. 2D) generally shares the properties of the second material layer for the composite solid state architectures (FIGS. 2B and C). Accordingly, the solid electrolyte layer of all three of these architectures will be referred to below as a second material layer or second layer.

A wide variety of materials may be used in fabricating protective composites in accordance with the present invention, consistent with the principles described above. For example, in the solid state embodiments of FIGS. B and C, the first layer (material component), in contact with the active metal, may be composed, in whole or in part, of active metal nitrides, active metal phosphides, active metal halides active metal sulfides, active metal phosphorous sulfides, or active metal phosphorous oxynitride-based glass. Specific examples include $Li_3N$, $Li_3P$, LiI, LiBr, LiCl, LiF, $Li_2S$—$P_2S_5$, $Li_2S$—$P_2S_5$—LiI and LiPON. Active metal electrode materials (e.g., lithium) may be applied to these materials, or they may be formed in situ by contacting precursors such as metal nitrides, metal phosphides, metal halides, red phosphorus, iodine, nitrogen or phosphorus containing organics and polymers, and the like with lithium. A particularly suitable precursor material is copper nitride (e.g., $Cu_3N$). The in situ formation of the first layer may result from an incomplete conversion of the precursors to their lithiated analog. Nevertheless, such incomplete conversions meet the requirements of a first layer material for a protective composite in accordance with the present invention and are therefore within the scope of the invention.

For the anolyte interlayer composite protective architecture embodiment (FIG. 2D), the protective membrane architecture has an active metal ion conducting separator layer chemically compatible with the active metal of the anode and in contact with the anode, the separator layer comprising a non-aqueous anolyte, and a substantially impervious, ionically conductive layer ("second" layer) in contact with the separator layer, and chemically compatible with the separator layer and with the exterior of the anode compartment. The separator layer can be composed of a semi-permeable membrane impregnated with an organic anolyte. For example, the semi-permeable membrane may be a micro-porous polymer, such as are available from Celgard, Inc. The organic anolyte may be in the liquid or gel phase. For example, the anolyte may include a solvent selected from the group consisting of organic carbonates, ethers, lactones, sulfones, etc, and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure. When the anolyte is in the gel phase, gelling agents such as polyvinylidine fluoride (PVdF) compounds, hexafluropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will, of course, also include active metal salts, such as, in the case of lithium, for example, $LiPF_6$, $LiBF_4$, $LiAsF_6$, $LiSO_3CF_3$ or $LiN(SO_2C_2F_5)_2$. In the case sodium, suitable anolytes will include active metal salts such as $NaClO_4$, $NaPF_6$, $NaAsF_6$ $NaBF_4$, $NaSO_3CF_3$, $NaN(CF_3SO_2)_2$ or $NaN(SO_2C_2F_5)_2$, One example of a suitable separator layer is 1 M $LiPF_6$ dissolved in propylene carbonate and impregnated in a Celgard microporous polymer membrane.

The second layer (material component) of the protective composite may be composed of a material that is substantially impervious, ionically conductive and chemically compatible with the first material or precursor, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass, Nasiglass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ ($0.1 \leq x \leq 0.9$) and crystallographically related structures, $Li_{1+x}Hf_{2-x}Al_x(PO_4)_3$ ($0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | | mol % |
|---|---|---|
| $P_2O_5$ | | 26-55% |
| $SiO_2$ | | 0-15% |
| $GeO_2 + TiO_2$ | | 25-50% |
| in which | $GeO_2$ | 0-50% |
| | $TiO_2$ | 0-50% |
| $ZrO_2$ | | 0-10% |
| $M_2O_3$ | | 0-10% |
| $Al_2O_3$ | | 0-15% |
| $Ga_2O_3$ | | 0-15% |
| $Li_2O$ | | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0 \leq x \leq 0.4$ and $0 \leq y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

The composite should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode. For example, the first material layer for the solid state membranes can have a thickness of about 0.1 to 5 microns; 0.2 to 1 micron; or about 0.25 micron. Suitable thickness for the anolyte interlayer of the fourth embodiment range from 5 microns to 50 microns, for example a typical thickness of Celgard is 25 microns.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example about 20 microns.

Referring back to FIG. 1, the protective membrane architecture 102 is joined to the anode container 106 such that it provides a substantially impervious wall component over an open end of the container. The joint, at 117, is hermetically sealed by the polymeric adhesive seals of the instant invention. The seals may be set on any surface of the protective membrane architecture, including the surface of the first material layer, precursor layer and/or solid electrolyte layer (second material layer). For example, in an embodiment whereby the protective membrane architecture comprises a $Cu_3N$ precursor layer the seal may be formed on the surface of the $Cu_3N$ precursor and/or on the surface of the solid electrolyte layer (second material layer).

The protective membrane architectures, described above, comprise at least one substantially impervious solid electrolyte layer (e.g., second material layer). In one embodiment of a protected anode architecture, the anode container is joined to the protective membrane architecture on the surface of the solid electrolyte layer as it provides an impervious platform for bonding. In this embodiment the polymer adhesive seal is set at the joint, generally at 117 between the solid electrolyte layer of the protective membrane architecture 102 and the container 106, thereby forming a substantially impervious anode compartment having an interior and exterior region. The polymer adhesive seals may be applied at the interface, at 111, or at the edges of the joint, located in the interior and on the exterior of the anode container, at 113 and 115 respectively. For example, in an embodiment whereby the membrane architecture comprises an anolyte interlayer, as illustrated in FIG. 2D, the polymeric adhesive seals are preferably formed on the surface of the solid electrolyte layer (second material layer), 234.

The seals of the instant invention are comprised of polymeric adhesives. Polymeric adhesives have both physical and chemical properties that are advantageous for forming a strong reliable barrier seal, including chemical resistance, barrier properties, wetting behavior that facilitates flow and bonding for ease of fabrication, electrical insulation, superior bond strength and ruggedness due, in part, to their inherent ductility. Polymers have a robust chemistry that allow for compositional and structural variations to tailor properties and afford a wide range of methods to apply and set the seals, such as by thermal compression, hot-melting, dissolving or dispersing polymer(s) into a carrier solvent followed by brushing or spraying, as well as various techniques to cure the adhesive including visible/ultra-voilet exposure, heat, and chemical reaction.

An adhesive polymer seal in accordance with the present invention provides the required hermetic barrier while avoiding the drawbacks associated with formation of a potential alternative sealing technique, such as a glass seal, for example.

Relative to a glass seal, the adhesive polymer seal avoids thermal degradation of any of the materials being joined by the seal or otherwise in the an incorporating battery cell at the high temperatures (e.g., several hundred to 1000° C. or more) required to from a glass seal; is less brittle than a glass seal; and avoids the coefficient of thermal expansion (CTE) mismatch stresses associated with such high temperature processing of multiple materials. The adhesive polymer seal can be formed below the melting or glass transition temperatures of either or any of the materials being joined by the seal, as it may generally be conducted in a room temperature or otherwise ambient environment.

The polymer adhesive seals of the instant invention may be elastomers, thermoplastics or thermosetting. The adhesives of this invention provide a substantially impervious and chemically resistant seal at the interface and edges, where the joint is made, between the protective membrane architecture and the anode container. The polymer adhesive seals adhere to both the protective membrane architecture and anode container surfaces, and the adhesive bond is able to withstand the operating environment of the device for its intended service life. While not a requirement, the polymer adhesive seals may also provide some or all of the bond strength necessary to join the membrane architecture to the anode container. In a preferred embodiment the polymer adhesive seals provide the necessary bond strength to join the anode container to the membrane architecture, so additional bond agents at the joint are unnecessary.

While it is advantageous to use an adhesive polymer seal to provide the bond that joins the anode container to the protective membrane architecture, bonding agents may be used to enhance the strength of the bonded joint. The bonding agents, in accordance with the present invention, do not need to provide barrier function or be chemically resistant to the elements inside or outside the anode compartment, as they can be over-coated with polymer seals of the instant invention.

Particularly suitable bonding agents are, in fact, also polymeric adhesives, and their advantages are similar to those described above for polymer adhesive seals. The requirements of a bonding agent, however, are less restrictive than those of a seal, since it does not require barrier functionality or chemical resistance to anolyte or catholyte. Accordingly, a broad range of bonding agents are enabled by the seals of the instant invention. These include epoxy based bonding agents and heat sealable thermoplastics such as low density polyethylene (LDPE).

For example, in one embodiments the bonding agent is set at the container/membrane interface, at 111, where there is a platform for bonding and an inner and outer edge to subsequently cover the bonding agent with substantially impervious chemically resistant polymer adhesive seals. For example, if the bonding agent is set at 111, the polymer seals can be set on the interface edges, at 113 and 115, thereby covering the interface and isolating the bond agent.

The strength and stability of the bond formed by the polymer seals and/or bonding agents of the instant invention may be facilitated by pre-treatment of the surface of the protective membrane architecture, generally on the surface of the substantially impervious solid state electrolyte. These include treatments to roughen the surface of the membrane such as chemical etching (acid or base) and mechanical grinding. A particularly suitable etchant is concentrated lithium hydroxide. Moreover, the protective membrane architecture may comprise primer coatings to enhance bonding. Accordingly, the surface of the membrane around its perimeter may be coated with a primer such as thin layers of inorganic compounds chemically stable in catholytes and anolytes. The thickness range for such primer coatings are from about 0.01 to 5 um, preferably from 0.05 to 0.5 um. Particularly suitable primer coating compounds are metal nitrides such as $SnN_x$ and titanium nitride that may be prepared by physical vapor deposition such as reactive sputtering in a $N_2$ atmosphere. Other suitable primers include oxides such $In_2O_3$, $SnO_2$, and $TiO_2$ that may be prepared by sol-gel method, thermal evaporation, chemical vapor deposition and by pyrolysis.

In one embodiment, the polymer is dissolved in a carrier solvent before being applied onto the surface of the membrane and/or container to provide a seal where the interface of the joint will be formed. For example, a particularly suitable barrier seal adhesive comprises polyisobutylene (PIB) (Mw: 60,000 to 5,000,000) such as that supplied by Exxon under the tradename of VISTONEX, which forms a strong and rugged bond to the solid electrolyte layers of the protective membrane architecture and has excellent chemical resistance to organic solvents commonly used for anolyte such as carbonates and good resistance to ambient moisture and aqueous solutions. Dissolved in warm heptane a solution comprising PIB may be applied to the joint interface at 111 by brush or spray coating the edge of the container wall and/or solid electrolyte surface of the membrane architecture; the polymer seal bonds and sets as the solvent carrier evaporates. To further ensure an adequate seal, the PIB/heptane solution may be coated onto the interface edges at the joint, at 113 and 115.

In another embodiment, the polymer seal comprises a thermoplastic that is applied by the application of heat such as melting (e.g., using a hot-melt applicator) or heating in combination with applied pressure (e.g., using thermal compression). Thermoplastics such as those comprising polyethylene (PE), polypropylene (PP), ethylene vinyl acetate (EVA), ethylene acrylic acid (EAA), fluorocarbons comprising tetraflouroethylene, hexafluropropylene and the like, acid modified ethylene acids such as those commonly referred to by the trademark of Surlyn are also particularly useful. Moreover, hot melt/thermal compression adhesives are advantageous in that they do not contain carrier solvents, eliminating the need for solvent removal. In one method of bonding and sealing the container to the membrane architecture, a low-density polyethylene thermoplastic gasket is placed around the edge of the container wall, at 111, and a bond is set to the membrane by the application of heat and pressure. Additional thermoplastic seals (e.g., PE based) are then applied along the edges at 113 and 115.

In another embodiment, the seal comprises a thermosetting polymer adhesive, cured by heat, chemical reaction, or radiation (e.g., exposure to ultraviolet). A particularly suitable thermosetting adhesive is epoxy formed by curing an epoxy resin comprising epoxide with a curing agent. Epoxy based adhesives are advantageous as a barrier seal in that they combine a number of functional benefits including superior adhesive properties, dimensional stability, and excellent chemical resistance, particularly to aqueous environments. Preferably the epoxy adhesive is cured in a mild processing environment, such as less than 200° C. and in air. It is more preferred for the epoxy to be cured at room temperature. In a preferred embodiment the epoxy based adhesive is formed from a resin comprising epoxide and a curing agent comprising polyamide and cured at about 25 C. A specific epoxy adhesive formulation, Hysol E 120 HP, sold by Loctite, has been found to be particularly effective. This epoxy forms a strong bond to solid electrolyte layers and can be set in a room temperature, air environment using a chemical curing agent (hardener) comprising a polyamide. Polymer seals comprising Hysol E 120 HP have been found by helium leak-testing in our laboratory to be hermetic, and in our tests where the seal is exposed to aqueous solutions and non-aqueous solvents, the seal is found to be impervious to solvents. In one method to fabricate the protected anode architecture (e.g., using Hysol E 120 HP), the epoxy resin is thoroughly mixed with the hardener and applied to the edge of the wall of the anode container, generally at 117. The container is pressed against the protective membrane architecture on the surface of the solid electrolyte layer while the epoxy sets at 25 C for about 20 hours.

The polymer adhesive seals of the instant invention are sufficiently impervious to water preventing deleterious reaction of moisture with the active metal anode over the useful life of the protected anode (e.g., 1 week to 10 years or more, preferably about 1 month to 5 years). In one embodiment of the protected anode, a non-aqueous liquid electrolyte is used in an interlayer between the active metal foil and the solid electrolyte membrane. The seal should maintain the water content of this non-aqueous liquid electrolyte such that its moisture content, from the time that it is sealed in the anode compartment, does not increase beyond a level that would degrade anode structure or performance. In some embodiments, a suitable seal will prevent an increase in moisture content by more than 50 ppm, preferably by more than 20 ppm, and more preferably by more than 10 ppm. In the case of a fully solid-state protective membrane, the seal should maintain the moisture level of the compartment to similarly low $ppm_{H2O}$ in the inert gas of the anode compartment. Depending on the application, more than one type of polymer adhesive may be employed to seal the membrane architecture to the container interface. The seals are generally set at the joint at 117. For example seals may be set at the joint interface at 111, and/or at the interface edges on the interior and exterior wall of the anode compartment, at 113 and 115 respectively. Due to the versatility of the chemistry and favorable fabrication conditions, polymer adhesives enable a great many variations for seal configurations, and that many more possibilities exist in the case of employing multiple adhesive seal types. Accordingly, the seal configuration embodiments described in this specification are meant to exemplify the various possible seal configurations, they are not in any way meant to be limiting.

In one embodiment a polymer adhesive seal that is substantially impervious to organic solvents of an anolyte impregnated in the interlayer of a protective membrane architecture may be set at 113; while an outer polymer adhesive seal comprising a different polymer composition or structure, with excellent barrier properties (substantially impervious) to moisture and aqueous solutions may be set at 115. In this instant embodiment, one of the polymer seals might also be capable of providing the necessary bond strength to join the container to the membrane; accordingly, this seal could then also be set at the interface, at 111. Alternatively, a bonding agent, rather than a polymer adhesive seal, may be set at 111 to bond the joint. In such an embodiment polymer adhesive seals would be needed along the interface edges at 113 and 115. Moreover, multiple consecutive coating layers of polymer adhesive seals may be applied, including the re-application of the seal over an existing seal. This provides for an added degree of reliability and is beneficial to close off leaks occurring at interface gaps or direct leakage paths through cracks or pores of the bulk seal. In another embodiment a first polymer adhesive seal may be set along the interface edge at 115 on the exterior wall surface of the anode compartment and a second polymer adhesive seal having a different composition or structure is coated over the first seal to provide protection against the environment external to the anode.

In a preferred embodiment, a single type of polymer adhesive seal is adequate, to provide chemical resistance and a substantially impervious barrier to elements that it contacts from both inside and outside the anode compartment. Moreover, it is preferred that the polymer also provides the necessary mechanical bond strength to join the membrane to the container, so that no additional bonding agents are needed. In such a configuration, the polymer seal is set at the joint, generally in the region of 117; more specifically, it is preferred for the seal to be set on at least the interface, at 111 and may additionally be applied and set over the interface edges on the interior and exterior wall of the anode compartment, at 113 and 115, respectively. A particularly suitable polymer adhesive seal that provides all the necessary requirements of chemical resistance, barrier properties (substantial imperviousness to both the internal and external environment of the anode compartment) and bond strength is an epoxy seal comprising polyamide, for example Hysol E 120 HP sold by Loctite.

The protected anode architecture in accordance with the present invention facilitates the use of protected anodes in a variety of environments including those that would otherwise be corrosive to the active metal anode if not for the imperviousness of the anode compartment. For example, at varying times the outer surface of the architecture may be exposed during manufacturing to ambient, or during device operation the outer surface of the protected anode architecture may be in contact with elements that are corrosive to the active metal of the anode, such as electrochemical environments including aqueous solutions, water and water-based catholytes, air, and other materials reactive to lithium and other active metals, including organic solvents/catholytes and ionic liquids.

By effectively isolating (de-coupling) the anode from ambient and/or cathode, including catholyte (i.e., electrolyte about the cathode) environments, including such environments that are normally highly corrosive to Li or other active metals, the protected anode architecture protects from, and at the same time allows ion transport in and out of these potentially corrosive environments. In this way, a great degree of flexibility is permitted the other components of an electrochemical device, such as a battery cell, made with the architecture. Isolation of the anode from other components of a battery cell or other electrochemical cell in this way allows the use of virtually any solvent, electrolyte and/or cathode material in conjunction with the anode. Also, optimization of electrolytes or cathode-side solvent systems may be done without impacting anode stability or performance.

There are a variety of applications that could benefit from the use of aqueous solutions, including water and water-based electrolytes, air, and other materials reactive to lithium and other active metals, including organic solvents/electrolytes and ionic liquids, on the cathode side of the cell with an active (e.g., alkali, e.g., lithium) metal or active metal intercalation (e.g., lithium alloy or lithium-ion) anode in a battery cell.

Battery Cells

Figure 3:
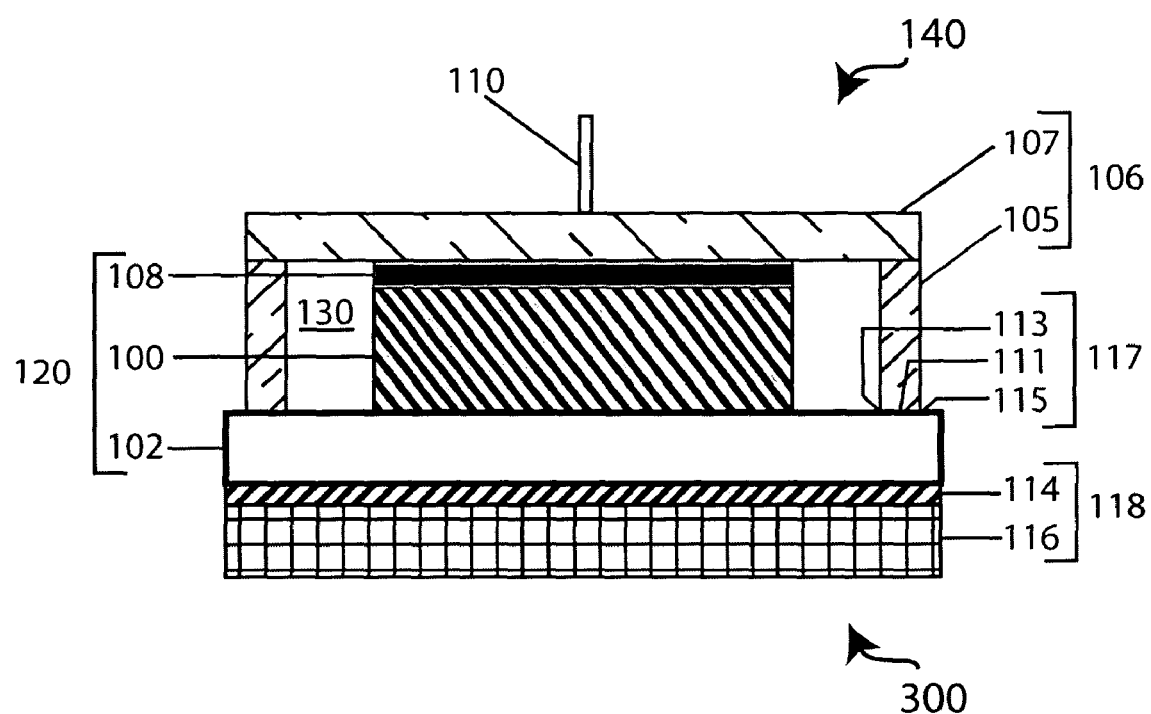
FIG. 3 is a schematic illustration of a battery cell incorporating a protected anode architecture in accordance with the present invention.

The protected anode architectures of the present invention are usefully adopted in battery cells. For example, the anode architecture 140 of FIG. 1 can be paired with a cathode system 118 to form a cell 300, as depicted in FIG. 3. The cathode system 118 comprises catholyte and a cathode structure 116 comprising at least an electronically conductive component, and it may also comprise an ionically conductive component, and an electrochemically active component. The catholyte is partially or fully retained inside the cathode structure; it may also be positioned in a designated volume between the cathode structure and the protective membrane (not shown), or impregnated inside an optional separator 114. The cathode system 118 may have any desired composition and, due to the isolation provided by the protective architecture 140, is not limited by the anode or anolyte composition. In particular, the cathode system may incorporate components which would otherwise be highly reactive with the anode active metal, such as aqueous materials, including water, aqueous catholytes and air, metal hydride electrodes and metal oxide electrodes.

The cathode system 118, also referred to as the cathode environment, includes an electronically conductive component, an ionically conductive component, and an electrochemically active component. The cathode system may also include an optional separator material 114, such as a Celgard microporous membrane or a cloth material such as a Zirconia cloth to keep the cathode structure from contacting and possibly damaging the solid electrolyte layer, and/or provide an ionically conductive reservoir for retaining catholyte. The cathode system 118 may have any desired composition and, due to the isolation provided by the anode compartment, is not limited by the anode or anolyte composition. In particular, the cathode system may incorporate components which would otherwise be highly reactive with the anode active metal, such as aqueous materials, including water, aqueous catholytes and air, metal hydride electrodes and metal oxide electrodes.

The catholyte may comprise a solid, liquid or gas. Moreover, the catholyte may comprise electrochemically active constituents such as but not limited to aqueous depolarizers, seawater, dissolved oxidants such as oxygen dissolved in aqueous solutions and non-aqueous solvents, reversible redox couples such as vanadium redox species used in flow cell batteries, and particulate redox couples that may be suspended in a liquid solution. While in the illustrated schematic the cathode environment 118 is not shown to be in contact with the polymer adhesive seals, it should be appreciated by those of skill in the art that in most common cell constructions and device applications, whereby the cathode environment comprises a liquid catholyte, the catholyte will be in contact with at least one of the seals, for example the seal at the exterior edge joint at 115 or the seal at the interface, at 111. Moreover, in some embodiments of an anolyte interlayer protective membrane architecture, the anolyte will also be in contact with at least one of the seals, for example the seal at 113.

Battery cells of the present invention may include, without limitation, water, aqueous solutions, air electrodes and metal hydride electrodes, such as are described in applicants' co-pending published US Applications US 2004/0197641, U.S. Pat. No. 7,645,543, issued Jan. 12, 2010), and US 2005/0175894, now U.S. Pat. No. 7,282,295, issued Oct. 16, 2007), incorporated herein by reference, and metal oxide electrodes, as used, for example, in conventional Li-ion cells.

The effective isolation between anode and cathode achieved by the protective membrane architecture of the present invention also enables a great degree of flexibility in the choice of catholyte systems, in particular aqueous systems, but also non-aqueous systems. Since the protected anode is completely decoupled from the catholyte, so that catholyte compatibility with the anode is no longer an issue, solvents and salts which are not kinetically stable to the active metal anode (e.g., Li metal) can be used.

For cells using water as an electrochemically active cathode material, a porous electronically conductive support structure can provide the electronically conductive component of the cathode system. An aqueous electrolyte (catholyte) provides ion carriers for transport (conductivity) of Li ions and anions that combine with Li. The electrochemically active component (water) and the ionically conductive component (aqueous ctaholyte) will be intermixed as a single solution, although they are conceptually separate elements of the battery cell. Suitable catholytes for the Li/water battery cell of the invention include any aqueous electrolyte with suitable ionic conductivity. Suitable electrolytes may be acidic, for example, strong acids like HCl, $H_2SO_4$, $H_3PO_4$ or weak acids like acetic acid/Li acetate; basic, for example, LiOH; neutral, for example, sea water, LiCl, LiBr, LiI; or amphoteric, for example, $NH_4Cl$, $NH_4Br$, etc.

The suitability of sea water as a catholyte enables a battery cell for marine applications with very high energy density. Prior to use, the cell structure is composed of the protected anode and a porous electronically conductive support structure (electronically conductive component of the cathode structure). When needed, the cell is completed by immersing it in sea water which provides the electrochemically active and ionically conductive components. Since the latter components are provided by the sea water in the environment, they need not transported as part of the battery cell prior to it use (and thus need not be included in the cell's energy density calculation). Such a cell is referred to as an "open" cell since the reaction products on the cathode side are not contained. Such a cell is, therefore, a primary cell.

Secondary Li/water cells are also possible in accordance with the invention. As noted above, such cells are referred to as "closed" cells since the reaction products on the cathode side are contained on the cathode side of the cell to be available to recharge the anode by moving the Li ions back across the protective membrane when the appropriate recharging potential is applied to the cell.

As noted above and described further below, in another embodiment of the invention, ionomers coated on the porous catalytic electronically conductive support reduce or eliminate the need for ionic conductivity in the electrochemically active material.

The electrochemical reaction that occurs in a Li/water cell is a redox reaction in which the electrochemically active cathode material gets reduced. In a Li/water cell, the catalytic electronically conductive support of the cathode structure facilitates the redox reaction. As noted above, while not so limited, in a Li/water cell, the cell reaction is believed to be:

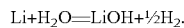

The half-cell reactions at the anode and cathode are believed to be:

Accordingly, the catalyst for the Li/water cathode promotes electron transfer to water, generating hydrogen and hydroxide ion. A common, inexpensive catalyst for this reaction is nickel metal; precious metals like Pt, Pd, Ru, Au, etc. will also work but are more expensive.

Also considered to be within the scope of Li (or other active metal)/water batteries of this invention are batteries with a protected Li anode and an aqueous catholyte composed of gaseous and/or solid oxidants soluble in water that can be used as active cathode materials (electrochemically active component). Use of water soluble compounds, which are stronger oxidizers than water, can significantly increase battery energy in some applications compared to the lithium/water battery, where during the cell discharge reaction, electrochemical hydrogen evolution takes place at the cathode surface. Examples of such gaseous oxidants are $O_2$, $SO_2$ and $NO_2$. Also, metal nitrites, in particular $NaNO_2$ and $KNO_2$ and metal sulfites such as $Na_2SO_3$ and $K_2SO_3$ are stronger oxidants than water and can be easily dissolved in large concentrations. Another class of inorganic oxidants soluble in water are peroxides of lithium, sodium and potassium, as well as hydrogen peroxide $H_2O_2$.

The use of hydrogen peroxide as an oxidant can be especially beneficial. There are at least two ways of utilizing hydrogen peroxide in a battery cell in accordance with the present invention. First of all, chemical decomposition of hydrogen peroxide on the cathode surface leads to production of oxygen gas, which can be used as active cathode material. The second, perhaps more effective way, is based on the direct electroreduction of hydrogen peroxide on the cathode surface. In principal, hydrogen peroxide can be reduced from either basic or acidic solutions. The highest energy density can be achieved for a battery utilizing hydrogen peroxide reduction from acidic solutions. In this case a cell with Li anode yields $E^0=4.82$ V (for standard conditions). However, because of very high reactivity of both acids and hydrogen peroxide to unprotected Li, such cell can be practically realized only for protected Li anode such as in accordance with the present invention.

For cells using air as an electrochemically active cathode material, the air electrochemically active component of these cells includes moisture to provide water for the electrochemical reaction. The cells have an electronically conductive support structure electrically connected with the anode to allow electron transfer to reduce the air cathode active material. The electronically conductive support structure is generally porous to allow fluid (air) flow and either catalytic or treated with a catalyst to catalyze the reduction of the cathode active material. An aqueous catholyte with suitable ionic conductivity or ionomer is also in contact with the electronically conductive support structure to allow ion transport within the electronically conductive support structure to complete the redox reaction.

The air cathode system includes an electronically conductive component (for example, a porous electronic conductor), an ionically conductive component with at least an aqueous constituent, and air as an electrochemically active component. It may be any suitable air electrode, including those conventionally used in metal (e.g., Zn)/air batteries or low temperature (e.g., PEM) fuel cells. Air cathodes used in metal/air batteries, in particular in Zn/air batteries, are described in many sources including "Handbook of Batteries" (Linden and T. B. Reddy, McGraw-Hill, NY, Third Edition) and are usually composed of several layers including an air diffusion membrane, a hydrophobic Teflon layer, a catalyst layer, and a metal electronically conductive component/current collector, such as a Ni screen. The catalyst layer also includes an ionically conductive component/electrolyte that may be aqueous and/or ionomeric. A typical aqueous catholyte is composed of KOH dissolved in water. An typical ionomeric electrolyte is composed of a hydrated (water) Li ion conductive polymer such as a per-fluoro-sulfonic acid polymer film (e.g., du Pont NAFION). The air diffusion membrane adjusts the air (oxygen) flow. The hydrophobic layer prevents penetration of the cell's catholyte into the air-diffusion membrane. This layer usually contains carbon and Teflon particles. The catalyst layer usually contains a high surface area carbon and a catalyst for acceleration of reduction of oxygen gas. Metal oxides, for example $MnO_2$, are used as the catalysts for oxygen reduction in most of the commercial cathodes. Alternative catalysts include metal macrocycles such as cobalt phthalocyanine, and highly dispersed precious metals such at platinum and platinum/ruthenium alloys. Since the air electrode structure is chemically isolated from the active metal electrode, the chemical composition of the air electrode is not constrained by potential reactivity with the anode active material. This can allow for the design of higher performance air electrodes using materials that would normally attack unprotected metal electrodes.

Another type of active metal/aqueous battery cell incorporating a protected anode and a cathode system with an aqueous component in accordance with the present invention is a lithium (or other active metal)/metal hydride battery. For example, lithium anodes protected with a non-aqueous interlayer architecture as described herein can be discharged and charged in aqueous solutions suitable as electrolytes in a lithium/metal hydride battery. Suitable catholytes provide a source or protons. Examples include aqueous solutions of halide acids or acidic salts, including chloride or bromide acids or salts, for example HCl, HBr, $NH_4Cl$ or $NH_4Br$.

In addition to the aqueous, air, etc., systems noted above, improved performance can be obtained with cathode systems incorporating conventional Li-ion battery cathodes and electrolytes, such as metal oxide cathodes (e.g., $V_2O_5$, $V_6O_{13}$, $Li_xCoO_2$, $Li_xNiO_2$, $Li_xMn_2O_4$, $LiFePO_4$, $Li_3V_2(PO_4)_3$, and $Li_3V_2P_3O_{11}F$) and the binary, ternary or multi-component mixtures of alkyl carbonates or their mixtures with ethers as solvents for a Li metal salt (e.g., $LiPF_6$, $LiAsF_6$ or $LiBF_4$); or Li metal battery cathodes (e.g., elemental sulfur or polysulfides) and electrolytes composed of organic carbonates, ethers, glymes, lactones, sulfones, sulfolane, and combinations thereof, such as EC, PC, DEC, DMC, EMC, 1,2-DME, THF, 2MeTHF, and combinations thereof, as described, for example, in U.S. Pat. No. 6,376,123, incorporated herein by reference.

Moreover, the catholyte solution can be composed of only low viscosity solvents, such as ethers like 1,2-dimethoxy ethane (DME), tetrahydrofuran (THF), 2-methyltetrahydrofuran, 1,3-dioxolane (DIOX), 4-methyldioxolane (4-MeDIOX) or organic carbonates like dimethylcarbonate (DMC), ethylmethylcarbonate (EMC), diethylcarbonate (DEC), or their mixtures. Also, super low viscosity ester solvents or co-solvents such as methyl formate and methyl acetate, which are very reactive to unprotected Li, can be used. As is known to those skilled in the art, ionic conductivity and diffusion rates are inversely proportional to viscosity such that all other things being equal, battery performance improves as the viscosity of the solvent decreases. The use of such catholyte solvent systems significantly improves battery performance, in particular discharge and charge characteristics at low temperatures.

Ionic liquids may also be used in catholytes of the present invention. Ionic liquids are organic salts with melting points under 100 degrees, often even lower than room temperature. The most common ionic liquids are imidazolium and pyridinium derivatives, but also phosphonium or tetralkylammonium compounds are also known. Ionic liquids have the desirable attributes of high ionic conductivity, high thermal stability, no measurable vapor pressure, and non-flammability. Representative ionic liquids are 1-Ethyl-3-methylimidazolium tosylate (EMIM-Ts), 1-Butyl-3-methylimidazolium octyl sulfate (BMIM-OctSO4), 1-Ethyl-3-methylimidazolium hexafluorophosphate, and 1-Hexyl-3-methylimidazolium tetrafluoroborate. Although there has been substantial interest in ionic liquids for electrochemical applications such as capacitors and batteries, they are unstable to metallic lithium and lithiated carbon. However, protected lithium anodes as described in this invention are isolated from direct chemical reaction, and consequently lithium metal batteries using ionic liquids are possible as an embodiment of the present invention. Such batteries should be particularly stable at elevated temperatures.

EXAMPLES

The following examples provide details illustrating advantageous properties and performance of protected anode architectures having polymer adhesive seals in accordance with the present invention. These examples are provided to exemplify and more clearly illustrate aspects of the present invention and are in no way intended to be limiting.

Example 1

Demonstration of Effectiveness of Polymer Adhesive Seal

A few ml of Hysol E 120 HP were dispensed from the 50 ml dual cartridge (Item 29353) onto a glass plate and thoroughly mixed. The mixed adhesive was transferred to the end of a 9 cm long pyrex tube having an OD of 25 mm and wall thickness of 1.5 mm and the adhesive coated pyrex tube was pressed against the top surface of a 1"×1" glass-ceramic plate supplied by the OHARA Corporation. The adhesive was cured at 25° C. for a period of 18-20 hours. The bonded plate/tube assembly was attached to a Varian 938-41 helium leak detector. The helium leak detector showed no leak through the seal when the volume was evacuated and the helium tracer probe was used. The sensitivity of the detector was $2 \times 10^{-10}$ atm cc/sec for helium.

Example 2

Testing of Protected Lithium Anodes Having Polymer Adhesive Seals in Various Aqueous Catholytes A number of protected anodes were constructed using seals between 1"×1" OHARA plates and glass tubes as described in Example 1. Lithium electrodes were fabricated by cutting circular disks of ⅝" diameter from lithium foil having a thickness of 0.2 to 4 mm. The lithium disks were pressed into a nickel foil current collector with a nickel wire for current collection. An interlayer between the lithium electrode and the glass-ceramic solid electrolyte consisted of a microporous membrane immersed in a non-aqueous solvent with a dissolved supporting electrolyte salt. Microporous membranes were made from Celgard disks of ¹³⁄₁₆" diameter cut from Celgard 3401 of 25 μm thickness. The Celgard disks were placed inside the pyrex tube against the glass-ceramic membrane, and 750 μl of _1.0 M supporting electrolyte salt in organic solvent. The electrolyte salts were chosen from the list: $LiClO_4$, $LiPF_6$, $LiBF_4$, $LiAsF_6$, $LiSO_3CF_3$, $LiN(CF_3SO_2)_2$, and $LiN(SO_2C_2F_5)_2$. Non-aqueous solvents were chosen from organic carbonates: EC, PC, DMC, EMC and others; ethers: 1,2-DME and higher glymes, THF, 2MeTHF, Dioxolane and others, as well as their binary and ternary mixtures were used as the solvents. The top of the protected anode compartment was then sealed by means of a silicone rubber stopper. The protected anode was then immersed in aqueous catholytes selected from the list: solutions in water of LiCl, LiBr, LiI, $NH_4Cl$, $NH_4Br$, HCl, $H_2SO_4$, acetic acid, HCl with addition of $H_2O_2$, $H_2SO_4$ with addition of $H_2O_2$, LiOH, synthetic sea water and others. A variety of metal screens were used for water electrolysis and current collection including nickel and titanium screen and Exmet. At least 30 cells of this type were tested by constant current discharge at temperatures ranging from −5° C. to 40° C., and currents ranging from 0.1 mA/cm² to 15 mA/cm². At least 6 cells were discharged to 100% of the available capacity of lithium, indicating a hermetic seal since any permeation of moisture into the anode compartment would significantly reduce the lithium capacity. The seal showed long-term stability in all aprotic non-aqueous electrolytes tested as well as in neutral, acidic and basic aqueous electrolytes as evidence by no visible evidence of seal degradation, no visual evidence of lithium electrode degradation on cell disassembly, and no evidence of gas buildup due to reaction of the lithium with moisture ($Li+H_2O=LiOH+\frac{1}{2}H_2$).

Example 3

Figure 4:
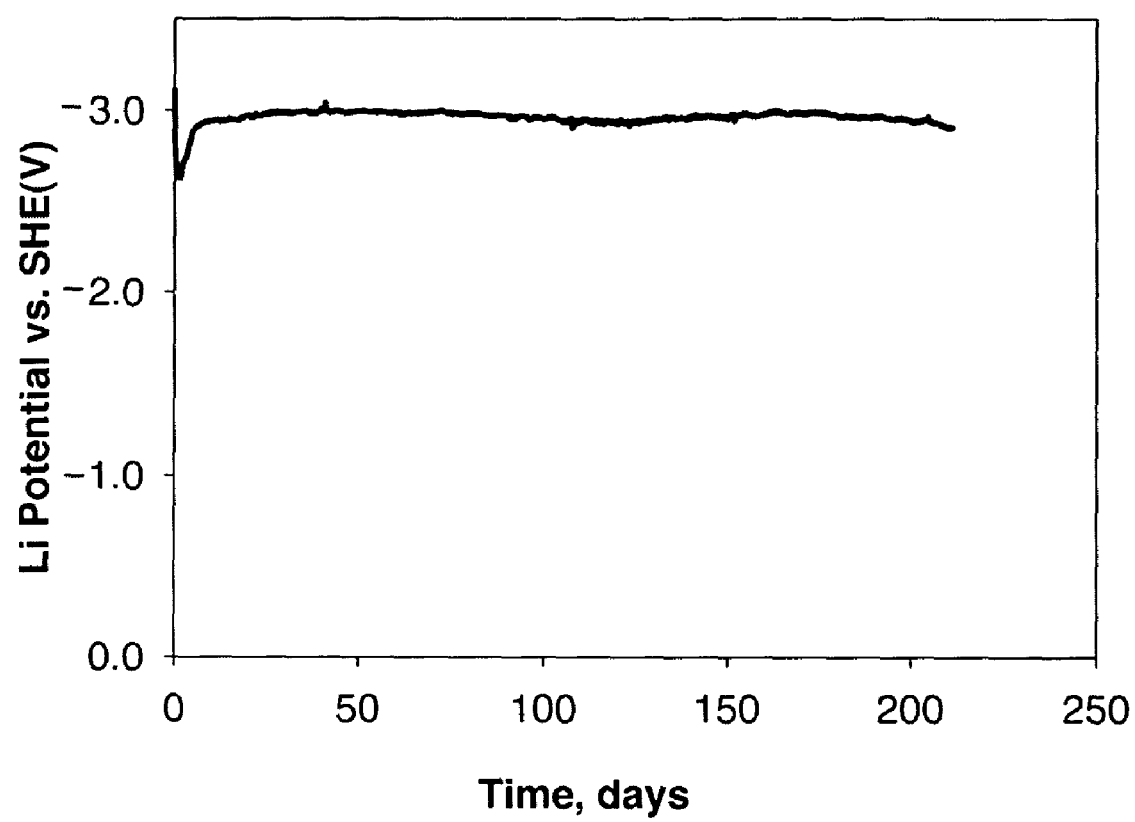
FIG. 4 depicts a plot of the discharge curve of the test cell of Example 3 incorporating a protected anode architecture having polymer adhesive seals, and in a seawater catholyte environment, in accordance with the present invention.

Long Term Testing of a Protected Lithium Anode Having Polymer Adhesive Seals in Seawater Catholyte A protected anode was assembled as described in Example 2. The non-aqueous anolyte consisted 750 μl of 1.0 M $LiClO_4$ in propylene carbonate; the lithium electrode was a circular disk of 2 $cm^2$ and 2475 μm in thickness; the glass-ceramic membrane was 150 μm thick. The protected anode was then immersed in 4 liters of artificial seawater (Ricca Chemical Company) and discharged at a current density of 0.1 $mA/cm^2$ for seven months. The achieved Li capacity was 506.5 mAh/$cm^2$. The discharge curve is plotted in FIG. 4. There is no sign of deterioration of performance due to seawater or non-aqueous solvent permeation through the adhesive seal.

Example 4

Figure 5:
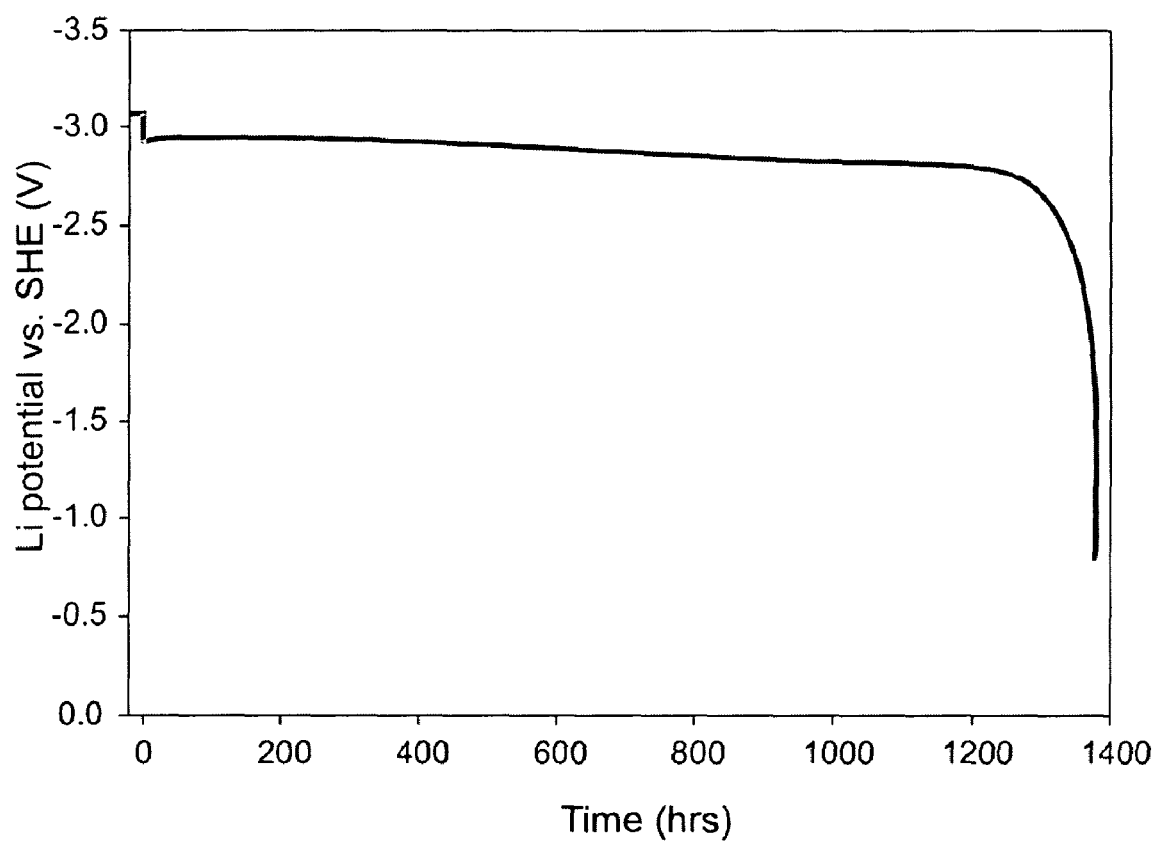
FIG. 5 depicts a plot of the discharge curve of the test cell of Example 4 incorporating a protected anode architecture having polymer adhesive seals and in an environment of an aqueous catholyte in accordance with the present invention.

Long Term Testing of a Protected Lithium Anode Having Polymer Adhesive Seals in Aqueous Catholyte A protected anode was assembled as described in Example 2. The non-aqueous anolyte contained 750 μl of 1.0 M $LiPF_6$ in propylene carbonate; the lithium electrode was a circular disk of 2 $cm^2$ and 3350 μm in thickness; the glass-ceramic membrane was 50 μm thick. The protected anode was then immersed in 100 ml of 4M $NH_4Cl$ in distilled water and discharged at a current density of 0.5 $mA/cm^2$ for close to 1400 hours. The discharge curve is plotted in FIG. 5. There was no sign of deterioration of performance due to water or non-aqueous solvent permeation through the adhesive seal, and 100% of the lithium foil placed in the anode compartment was discharged during the test demonstrating a completely hermetic seal stable to aqueous and non-aqueous solvents and electrolytes.

CONCLUSION

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. A protected anode architecture, comprising:
    an active metal anode;
    a protective membrane architecture conductive to ions of the active metal in ionic continuity with the anode;
    an anode container joined to the protective membrane architecture;
    at least one polymeric adhesive seal set at a joint between the protective membrane architecture and the container, thereby forming a substantially impervious anode compartment having an interior region exclusive of a cathode and hermetically sealed from an exterior region;
    wherein the seal is set at the joint on at least one of an interface between the protective membrane architecture and the container, and an interface edge between the protective membrane architecture and the container, such that the active metal anode is isolated in the anode compartment, while allowing for active metal ion transport into and out of the anode compartment.

2. The protected anode architecture of claim 1, wherein the active metal anode is in the solid phase.

3. The protected anode architecture of claim 2, wherein the active metal anode is at least 10 microns thick.

4. The protected anode architecture of claim 2, wherein the active metal anode is at least 50 microns thick.

5. The protected anode architecture of claim 2, wherein the active metal anode is at least 1 mm thick.

6. The protected anode architecture of claim 2, wherein the active metal anode is at least 1 cm thick.

7. The protected anode architecture of claim 1, wherein the active metal anode comprises an alkali metal.

8. The protected anode architecture of claim 7, wherein the alkali metal is Li.

9. The protected anode architecture of claim 7, wherein the alkali metal is Na.

10. The protected anode architecture of claim 1, wherein the active metal anode comprises active metal-ions.

11. The protected anode architecture of claim 1, wherein the active metal anode comprises active metal alloying metal.

12. The protected anode architecture of claim 11, wherein the active metal alloying metal is selected from the group consisting of Ca, Mg, Sn, Ag, Bi, Al, Cd, Ga, In and Sb.

13. The protected anode architecture of claim 1, wherein the active metal anode comprises intercalating material.

14. The protected anode architecture of claim 13, wherein the active metal intercalating material comprises carbon.

15. The protected anode architecture of claim 1, wherein the protective membrane architecture comprises an ionically conductive solid state membrane.

16. The protected anode architecture of claim 15, wherein the solid state membrane has an ionic conductivity of at least $10^{-5}$ S/cm.

17. The protected anode architecture of claim 15, wherein the solid state membrane has an ionic conductivity of at least $10^{-3}$ S/cm.

18. The protected anode architecture of claim 15, wherein the solid state membrane is monolithic.

19. The protected anode architecture of claim 15, wherein the solid state membrane comprises a composite comprising,
    a first material component in contact with the anode that is ionically conductive and chemically compatible with the active metal of the anode, and
    a second material component in contact with the first material component, the second material being substantially impervious, ionically conductive and chemically compatible with the first material component and the exterior of the anode compartment.

20. The protected anode architecture of claim 19, wherein the composite is a laminate.

21. The protected anode architecture of claim 19, wherein composite is graded.

22. The protected anode architecture of claim 19, wherein the first component comprises a material selected from the group consisting of active metal nitrides, active metal phosphides, and active metal halides, and active metal phosphorus oxynitride glass.

23. The protected anode architecture of claim 19, wherein the first component comprises a material selected from the group consisting of $Li_3N$, $Li_3P$ and LiI, LiBr, LiCl, LiF and LiPON, Li-sulfide, Li-phosphorous sulfide, $Li_2S$—$P_2S_5$, $Li_2S$—$P_2S_5$—LiI.

24. The protected anode architecture of claim 19, wherein the first component comprises a metal nitride first layer material precursor.

25. The protected anode architecture of claim 19, wherein the first component comprises the reaction product of $Cu_3N$ and Li.

26. The protected anode architecture of claim 19, wherein the second component comprises a material selected from the group consisting of glassy or amorphous metal ion conductors, ceramic active metal ion conductors, and glass-ceramic active metal ion conductors.

27. The component of claim 19 wherein the second component comprises a material selected from the group consisting of phosphorous based glass, oxide based glass, sulfur based glass, oxide sulfur based glass, selenide based glass, gallium based glass, germanium based glass, glass ceramic active metal ion conductors, sodium beta-alumina and lithium beta-alumina, Li superionic conductor (LISICON), Na superionic conductor (NASICON), LiPON, $Li_3PO_4.Li_2S.SiS_2$, $Li_2S.GeS_2.Ga_2S_3$, $Li_2O.11Al_2O_3$, $Na_2O.11Al_2O_3$, Nasiglass, $Li_{0.3}La_{0.5}TiO_3$, $Na_5MSi_4O_{12}$ (M: rare earth such as Nd, Gd, Dy), $(Na, Li)_{1+x}Ti_{2-x}Al_x(PO_4)_3$ ($0.0 \leq x \leq 0.9$) and crystallographically related structures, $Li_{1+x}Hf_{2-x}Al_x(PO_4)_3$ ($0.0 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$.

28. The protected anode architecture of claim 26, wherein the second component is an ion conductive glass-ceramic having the following composition:

| Composition | | Mol % |
|---|---|---|
| $P_2O_5$ | | 26-55% |
| $SiO_2$ | | 0-15% |
| $GeO_2 + TiO_2$ | | 25-50% |
| in which | $GeO_2$ | 0-50% |
| | $TiO_2$ | 0-50% |
| $ZrO_2$ | | 0-10% |
| $M_2O_3$ | | 0-10% |
| $Al_2O_3$ | | 0-15% |
| $Ga_2O_3$ | | 0-15% |
| $Li_2O$ | | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0 < X \leq 0.4$ and $0 < Y \leq 0.6$, and where Q is Al or Ga.

29. The protected anode architecture of claim 1, wherein the protective membrane architecture comprises,
an active metal ion conducting separator layer chemically compatible with the active metal of the anode and in contact with the anode, the separator layer comprising a non-aqueous anolyte, and
a substantially impervious, ionically conductive layer in contact with the separator layer, and chemically compatible with the separator layer and with the exterior of the anode compartment.

30. The protected anode architecture of claim 29, wherein the separator layer comprises a semi-permeable membrane impregnated with a non-aqueous anolyte.

31. The protected anode architecture of claim 30, wherein the semi-permeable membrane is a micro-porous polymer.

32. The protected anode architecture of claim 31, wherein the anolyte is in the liquid phase.

33. The protected anode architecture of claim 32, wherein the anolyte comprises a solvent selected from the group consisting of organic carbonates, ethers, esters, formates, lactones, sulfones, sulfolane and combinations thereof.

34. The protected anode architecture of claim 33, wherein the anolyte comprises a solvent selected from the group consisting of EC, PC, DEC, DMC, EMC, THF, 1,3-dioxolane, 2MeTHF, 1,2-DME or higher glymes, sufolane, methyl formate, methyl acetate, and combinations thereof and a supporting salt selected from the group consisting of $LiPF_6$, $LiBF_4$, $LiAsF_6$, $LiClO_4$, $LiSO_3CF_3$, $LiN(CF_3SO_2)_2$ and $LiN(SO_2C_2F_5)_2$, $NaClO_4$, $NaPF_6$, $NaAsF_6$ $NaBF_4$, $NaSO_3CF_3$, $NaN(CF_3SO_2)_2$ and $NaN(SO_2C_2F_5)_2$.

35. The protected anode architecture of claim 34, wherein the anolyte is in the gel phase.

36. The protected anode architecture of claim 35, wherein the anolyte comprises a gelling agent selected from the group consisting of PVdF, PVdF-HFP copolymer, PAN, and PEO and mixtures thereof; a plasticizer selected from the group consisting of EC, PC, DEC, DMC, EMC, THF, 2MeTHF, 1,2-DME, 1,3-dioxolane and mixtures thereof; and a Li salt selected from the group consisting of $LiPF_6$, $LiBF_4$, $LiAsF_6$, $LiClO_4$, $LiSO_3CF_3$, $LiN(CF_3SO_2)_2$ and $LiN(SO_2C_2F_5)_2$, $NaClO_4$, $NaPF_6$, $NaAsF_6$ $NaBF_4$, $NaSO_3CF_3$, NaN$(CF_3SO_2)_2$ and $NaN(SO_2C_2F_5)_2$.

37. The protected anode architecture of claim 29, wherein the substantially impervious ionically conductive layer comprises a material selected from the group consisting of glassy or amorphous active metal ion conductors, ceramic active metal ion conductors, and glass-ceramic active metal ion conductors.

38. The component of claim 29 wherein the second component comprises a material selected from the group consisting of phosphorous based glass, oxide based glass, sulfur based glass, oxide sulfur based glass, selenide based glass, gallium based glass, germanium based glass, glass ceramic active metal ion conductors, sodium beta-alumina and lithium beta-alumina, Li superionic conductor (LISICON), Na superionic conductor (NASICON), LiPON, $Li_3PO_4.Li_2S.SiS_2$, $Li_2S.GeS_2.Ga_2S_3$, $Li_2O.11Al_2O_3$, $Na_2O.11Al_2O_3$, Nasiglass, $Li_{0.3}La_{0.5}TiO_3$, $Na_5MSi_4O_{12}$ (M: rare earth such as Nd, Gd, Dy), $(Na, Li)_{1+x}Ti_{2-x}Al_x(PO_4)_3$ ($0.0 \leq x \leq 0.9$) and crystallographically related structures, $Li_{1+x}Hf_{2-x}Al_x(PO_4)_3$ ($0.0 \leq x \leq 0.9$) $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$.

39. The protected anode architecture of claim 29, wherein substantially impervious ionically conductive layer is an ion conductive glass-ceramic having the following composition:

| Composition | | mol % |
|---|---|---|
| $P_2O_5$ | | 26-55% |
| $SiO_2$ | | 0-15% |
| $GeO_2 + TiO_2$ | | 25-50% |
| in which | $GeO_2$ | 0-50% |
| | $TiO_2$ | 0-50% |

-continued

| Composition | mol % |
|---|---|
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0<x \leq 0.4$ and $0<Y \leq 0.6$, and where Q is Al or Ga.

40. The protected anode architecture of claim 1, wherein the polymeric adhesive seal is an epoxy.

41. The protected anode architecture of claim 40, wherein the polymeric adhesive epoxy seal comprises polyamide.

42. The protected anode architecture of claim 40 wherein the polymeric adhesive seal is substantially impervious to aqueous catholyte and anolyte comprising organic solvents.

43. The protected anode architecture of claim 1, wherein the polymeric adhesive seal comprises a thermoplastic.

44. The protected anode architecture of claim 43, wherein the polymeric adhesive seal comprises a material from the group consisting polyethylene, polypropylene, ethylene vinyl acetate, ethylene acrylic acid, tetrafluoroethylene, hexafluoropropylene and acid modified ethylene acids.

45. The protected anode architecture of claim 1, wherein the polymeric adhesive seal comprises polyisobutylene having a molecular weight in the range of 60,000 to 5,000,000.

46. The protected anode architecture of claim 1, wherein the protective membrane architecture and the container are sealed by at least two polymer adhesive seals having different composition or structure.

47. The protected anode architecture of claim 46, wherein a polymer adhesive seal is set at the interface edge on the interior wall of the anode compartment and a second polymer adhesive seal having a different composition or structure is set at the interface edge on the exterior wall of the compartment.

48. The protected anode architecture of claim 47, wherein the polymer adhesive seal on the interior wall of the anode compartment is substantially impervious to components that it contacts from the interior environment of the anode compartment and the different polymer adhesive seal on the exterior wall of the anode compartment is substantially impervious to components that it contacts from the exterior environment.

49. The protected anode architecture of claim 1, further comprising a bonding agent.

50. The architecture of claim 1, wherein the environment exterior to the anode compartment comprises a cathode system comprising catholyte and a cathode structure.

51. The architecture of claim 50, wherein the catholyte comprises water.

52. The architecture of claim 51, wherein the catholyte comprises water as an electrochemically active component.

53. The architecture of claim 51, wherein the catholyte further comprises a water soluble oxidant selected from the group consisting of gaseous, liquid and solid oxidants and combinations thereof.

54. The architecture of claim 53, wherein the water soluble gaseous oxidants are selected from the group consisting of $SO_2$, $NO_2$, $O_2$, and the water soluble oxidants are selected from the group consisting of $NaNO_2$, $KNO_2$, $Na_2SO_3$ and $K_2SO_3$.

55. The architecture of claim 53, wherein the water soluble oxidant is a peroxide.

56. The architecture of claim 55, wherein the water soluble oxidant is hydrogen peroxide.

57. The architecture of claim 51, wherein the aqueous catholyte is selected from the group consisting of strong acid solutions, weak acid solutions, basic solutions, neutral solutions, amphoteric solutions, peroxide solutions and combinations thereof.

58. The architecture of claim 57, wherein the aqueous catholyte comprises members selected from the group consisting of aqueous solutions of HCl, $H_2SO_4$, $H_3PO_4$, acetic acid/Li acetate, LiOH; seawater, LiCl, LiBr, LiI, NH4Cl, NH4Br and hydrogen peroxide, and combinations thereof.

59. The architecture of claim 58, wherein the aqueous catholyte is sea water.

60. The architecture of claim 58, wherein the aqueous catholyte comprises sea water and hydrogen peroxide.

61. The architecture of claim 50, wherein the cathode system comprises a cathode structure comprising an intercalation compound selected from the group consisting of $V_2O_5$, $V_6O_{13}$, $Li_xCoO_2$, $Li_xNiO_2$, $Li_xMn_2O_4$, $LiFePO_4$, $Li_3V_2(PO_4)_3$, and $Li_3V_2P_3O_{11}F$.

62. The architecture of claim 61, wherein the catholyte comprises a non-aqueous solvent.

63. A method of making a protected anode architecture, comprising:
providing an active metal anode in ionic continuity with an ionically conductive protective membrane architecture conductive to ions of the active metal; and
joining an anode container to the protective membrane architecture to form an anode compartment having an interior region exclusive of a cathode and hermetically sealed from an exterior region;
wherein the joining comprises sealing the anode compartment at a joint between the membrane architecture and the container by one or more polymer adhesive seals;
wherein the one or more polymer adhesive seals is set at the joint on at least one of an interface between the protective membrane architecture and the container, and an interface edge between the protective membrane architecture and the container, such that the active metal anode is isolated in the anode compartment, while allowing for active metal ion transport into and out of the anode compartment.

64. The method of claim 63, wherein the polymer adhesive seals are set on at least one of an interface between the protective membrane architecture and the container, and an interface edge between the protective membrane architecture and the container located on at least one of the interior and exterior surface of the anode compartment.

65. The method of claim 64, whereby a single type of polymer adhesive is used to make the seal.

66. The method of claim 64, whereby more than one type of polymer adhesive is used to make the seal.

67. The method of claim 64, whereby the polymer adhesive seal is cured by a chemical reaction with a hardener.

68. The method of claim 64, whereby the seal is set at room temperature.

69. The method of claim 68, whereby the polymer adhesive is dissolved in a carrier solvent prior to being set at the joint.

70. The method of claim 69, whereby the polymer adhesive is applied to the bonding surfaces of the joint by brushing.

71. The method of claim 64, whereby the polymer adhesive is a thermoplastic and applied to the bonding surfaces of the joint by a hot melt applicator.

72. The method of claim 64, whereby a bonding agent is used to join the membrane to the container and one type of polymer adhesive is used to make the seal at the interface edge on the exterior surface of the anode compartment and a different type of polymer adhesive is used to make the interface edge seal on the interior surface.

73. The method of claim 64, whereby a first polymer adhesive is applied at the joint to form a first seal and a second seal is applied over the first seal.

74. The method of claim 63, further comprising combining the protected anode architecture with a cathode to form an electrochemical cell.

75. The method of claim 74, wherein the cell is a battery cell.

76. The method of claim 75, wherein the cell is a Li-metal/air battery call.

77. The method of claim 75, wherein the cell is a Li-metal/seawater battery call.

78. The method of claim 75, wherein the cell is a Li-carbon/transition metal intercalation Li-ion type battery cell.

* * * * *